Aug. 26, 1930. H. J. KERR 1,773,735
METHOD AND APPARATUS FOR MEASURING THE CONCENTRATION OF SOLIDS IN LIQUIDS
Original Filed Feb. 18, 1921
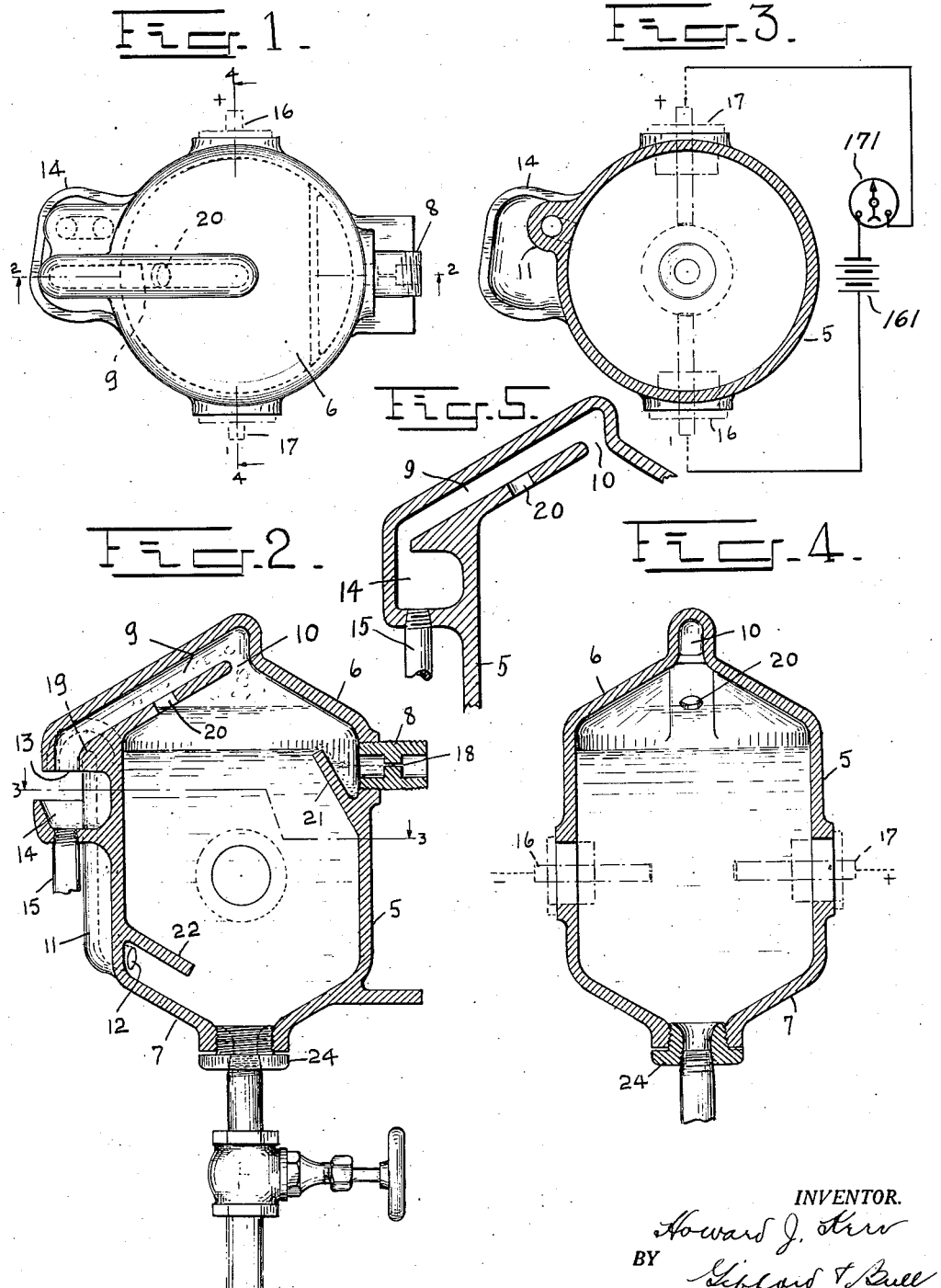
INVENTOR.
Howard J. Kerr
BY
Gifford & Bull
his ATTORNEYS.

Patented Aug. 26, 1930

1,773,735

UNITED STATES PATENT OFFICE

HOWARD J. KERR, OF BAYONNE, NEW JERSEY, ASSIGNOR TO THE BABCOCK & WILCOX COMPANY, OF BAYONNE, NEW JERSEY, A CORPORATION OF NEW JERSEY

METHOD AND APPARATUS FOR MEASURING THE CONCENTRATION OF SOLIDS IN LIQUIDS

Application filed February 18, 1921, Serial No. 446,032. Renewed October 5, 1928.

My invention more particularly relates to a method of and apparatus for withdrawing liquid from a liquid body to a pool having a substantially constant temperature. My invention is especially applicable is measuring the amount of solids contained in a liquid, especially in a steam boiler. In power houses and in connection with manufacturing processes, it is desirable to determine the amount of solids, either in the form of soluble salts or suspended solids, contained in water. It is known that the conductivity of a liquid varies with the amount of solids contained therein, so that by measuring its conductivity, the amount of contained solids may be determined. Ordinarily, however, it is not feasible to apply this method directly to the measurement of the solids in the liquid of a boiler, still or other apparatus in which the liquid is heated, since the pressure-temperature condition of the liquid is variable, and its conductivity varies with the temperature. In accordance with my invention, a small portion of the liquid may be withdrawn from the bulk of the liquid of higher pressure-temperature condition to a chambered body or cell having a lower pressure-temperature condition, the liquid preferably being maintained at its boiling point, and by measuring the conductivity of the liquid so withdrawn, the concentration of the solids contained therein may readily be determined.

My invention will best be understood by reference to the accompanying drawings, in which Fig. 1 is a plan view of my cell; Fig. 2 is a vertical section taken on the line 2—2 in Fig. 1; Fig. 3 is a horizontal section taken on the line 3—3 in Fig. 2; Fig. 4 is a vertical section taken on the line 4—4 in Fig. 1, and Fig. 5 illustrates a modified form of my invention in which the chambered body is cannected to a space other than the atmosphere and having a constant pressure.

Like numerals indicate like parts throughout the several views.

The chambered body or cell embodied in my invention referably comprises a cylindrical or tubular body 5, which is preferably formed with upper and lower tapered ends, which are here shown as conical. The upper portion of the body 5 is provided with a throttling nozzle 8, which is adapted to be connected to a liquid body, such as that contained in a steam boiler. The chambered body is provided with a steam passage 9 provided with an inlet 10 preferably located at the apex of the upper conical portion of the chambered body, the opposite end of the passage communicating with a space having a constant pressure, which, in the specific embodiment illustrated in Fig. 2, is the atmosphere. An outlet passage 11 is provided for the liquid in the chambered body in the inlet for the passage preferably communicating with the lower portion of the chambered body, as at 12, and its opposite end 13 being arranged to discharge liquid from the chambered body into a drain trough 14, the uppermost portion of the passage, indicated at 19, being located above the inlet 12. The drain trough 14 is provided with a drain pipe 15. When the conductivity of the liquid contained in the chambered body or cell is to be measured, electrodes 16 and 17 are mounted by known means in the walls of the chambered body, so that when the electrodes are connected to a suitable electric circuit, including a suitable source of electric energy, such as a battery 161, and a suitable instrument, such as a galvanometer 171, the conductivity of the liquid contained in the chambered body between the electrodes may be measured, and the concentration of the solids in the liquid can readily be determined. The provision of the passage 11 having an inlet opening 12 near the bottom of the chambered body causes a circulation and mixing of the water therein through forcing the water to flow downward therethrough before it is discharged; they also serve to maintain the water in the chambered body at constant level.

When it is desired to determine the concentration of solids in a liquid, such as that contained in a steam boiler, the chambered body connected my invention is connected by means of the nozzle 8 to the boiler or the like below the liquid level therein. The water or other liquid passes through the orifice in the nozzle 8 and expands within the chambered body to atmospheric pressure, the water being maintained at its boiling point. Part of the water is thus flashed into steam under a constant pressure, the steam passing through the passage 9, and the condensate being received in the trough 14, from which it drains through the pipe 15 to the hot well or to waste. The water level in the chambered body or cell is determined by the upper end 19 of the passage 11, the liquid from the chambered body passing through the said passage and into the trough 14, from which it also may drain through pipe 15. Any excess water in the chambered body, which would result from an improper rise in the water level therein, would find its way through the aperture 20 in the wall of the chambered body to the passage 9.

In order to insure a quite flow of liquid over the electrodes in the body of the cell, I provide a baffle 21 over which the entering liquid must flow. A baffle 22, which may be integral with the walls 5 of the chambered body, is preferably provided on the lower interior side in front of the inlet 12 for the passage 11, in order that the entering liquid may not be short-circuited, but will be forced to circulate within the chambered body and mingle with the liquid contained therein.

The lower tapered or conical end of the chambered body embodying my invention has a particular advantage in that in many cases, the liquid therein contains a certain amount of mud, and the conical shape causes the deposit of such material to lodge in the lower part of the chambered body from which it can readily be cleaned by removing the plug 24, which is located at the lower end thereof.

In the embodiment of my invention illustrated in Figs. 1, 2, 3 and 4, in which the steam space communicates with the atmosphere, the liquid within the chambered body, if water, for instance, will be kept at the boiling point of water with the contained solids. A temperature above or below such boiling point may be secured, however, by cutting off communication with the atmosphere, as indicated in Fig. 5, and connecting the drain pipe 15, or other suitable connection, to a space having a desired constant-pressure condition, such as a condenser or a low-pressure heater.

It will be understood that, preferably, in order to be certain that a substantially constant temperature is maintained during the determination of the amount of solids in the liquid, liquid will be passed through the inlet 18 continuously during the entire time of the determination. If desired, continuous readings may be made by having the inlet 18 open at all times, and a recording instrument of any of the well-known types in the electric circuit, so that a continuous record of the concentration in the body of liquid under observation may be had.

The liquid for the pool is readily maintained at its boiling point, and by maintaining the liquid at the boiling point at a fixed pressure, the temperature of the liquid is substantially constant during the period that its conductivity and liquid content is being determined.

What I claim and desire to secure by Letter Patent of the United States is:

1. The method of measuring the concentration of solids in a liquid body subjected to pressure which consists in continuously withdrawing liquid from the liquid body to form a pool with a free space above the pool, maintaining the pressure above said pool substantially constant and lower than that of the liquid body, maintaining the liquid in said pool at the boiling point, and measuring the electrical conductivity of the liquid in the pool.

2. The method of measuring the concentration of solids in a liquid body having a variable pressure-temperature condition which consists in continuously withdrawing liquid from the liquid body to form a pool with a free space above the pool, maintaining the pressure above said pool substantially constant and lower than that of the liquid body, maintaining the liquid in said pool at the boiling point, and measuring the electrical conductivity of the liquid in the pool.

3. The method of measuring the concentration of solids in a liquid body subjected to pressure which consists in continuously withdrawing liquid from the liquid body into a hooded vessel to form a pool with a free space above the pool, maintaining the pressure above said pool substantially constant and lower than that of the liquid body, maintaining the liquid in said pool at the boiling point, and measuring the electrical conductivity of the liquid in the pool.

4. The method of measuring the concentration of solids in a liquid body having a variable-pressure-temperature condition, which consists in continuously withdrawing liquid from the liquid body, flashing a part of the liquid under constant pressure as it is withdrawn and forming a pool of the remainder thereof having a constant temperature, and measuring the electrical conductivity of the liquid in the pool.

5. The method of measuring the concentration of solids in a liquid body having a variable-pressure-temperature condition, which consists in continuously withdrawing liquid from the liquid body, flashing a part of the liquid under constant pressure as it is withdrawn and forming a pool of the remainder having a constant temperature, circulating the liquid in the pool, and measuring the electrical conductivity of the liquid in the pool.

6. In an electrical testing apparatus for determining the concentration of solids in boiler water, a channel arranged to withdraw water from the boiler, a testing apparatus to which the said water of varying temperature is led and in a part of which a pool of water is maintained, and means for measuring the electrical conductivity of the water in the pool, said apparatus being arranged to automatically maintain the water at the boiling point under substantially constant pressure.

7. In an electrical testing apparatus for determining the concentration of solids in boiler water, a channel arranged to withdraw water from the boiler, a testing apparatus to which the said water of varying temperature is led and in a part of which a pool of water is maintained, and means for measuring the electrical conductivity of the water in the pool, the parts being constructed and arranged to maintain a substantially constant pressure above the pool and to permit a portion of the water in the pool to flash into steam whereby a substantially constant temperature in the pool is maintained.

8. In an electrical testing apparatus for determining the concentration of solids in boiler water, a channel arranged to withdraw water from the boiler, a testing apparatus to which the said water of varying temperature is led and in a part of which a pool of water is maintained, means for maintaining a substantially constant level of the liquid in the pool, and means for measuring the electrical conductivity of the water in the pool, said apparatus being arranged to automatically maintain the water at the boiling point under substantially constant pressure.

9. A hooded chambered body having means associated therewith for withdrawing liquid from a liquid body to said chambered body and constructed and arranged to flash a portion of the liquid into steam under constant pressure whereby the remainder of the liquid is maintained at substantially constant temperature, and electrical means for measuring the conductivity of the liquid in the pool.

10. A hooded chambered body having means associated therewith for withdrawing liquid from a liquid body to said chambered body and constructed and arranged to flash a portion of the liquid into steam under constant pressure, and electrical means for measuring the conductivity of the liquid in the pool, said chambered body being vented.

11. In an electrical testing apparatus for determining the concentration of solids in boiler water, a channel arranged to withdraw water from the boiler, a testing apparatus to which the said water of varying temperature is led and in a part of which a pool of water is maintained, and means for measuring the electrical conductivity of the water in the pool, means for circulating the water in said pool, the parts being constructed and arranged to maintain a substantially constant pressure above the pool and to permit a portion of the water in the pool to flash into steam.

12. The method of measuring the concentration of solids in a liquid body which consists in continuously replenishing the liquid in said body, maintaining the liquid at the boiling point under substantially constant pressure, and measuring the electrical conductivity of the liquid.

13. In a testing device for measuring the concentration of a solution comprising a liquid pool of said solution, means for maintaining the liquid in said pool at the boiling point under substantially constant pressure, means for continuously replenishing the supply of liquid in said pool, and means for measuring the electrical conductivity thereof.

14. The method of measuring the concentration of a solution which consists in providing a pool of said solution, maintaining said pool at the boiling point under substantially constant pressure, replenishing the material of said pool and measuring the electrical conductivity of the solution forming said pool.

HOWARD J. KERR.